Dec. 17, 1929. A. R. McARTHUR 1,739,556
MATCHER
Filed Jan. 26, 1928 2 Sheets-Sheet 2

Inventor:
ARTHUR R. McARTHUR,
by: D. Anthony Usina
his Attorney.

Patented Dec. 17, 1929

1,739,556

UNITED STATES PATENT OFFICE

ARTHUR R. McARTHUR, OF GARY, INDIANA, ASSIGNOR TO AMERICAN SHEET AND TIN PLATE COMPANY, OF PITTSBURGH, PENNSYLVANIA, A CORPORATION OF NEW JERSEY

MATCHER

Application filed January 26, 1928. Serial No. 249,648.

This invention relates to sheet and plate handling apparatus and while not limited thereto relates more particularly to a combined matching and conveying apparatus located between a shearing apparatus and sheet doubler.

In the manufacture of sheets or light gage plates by some methods it is the practice to first roll a long strip of metal and then to shear this strip up into relatively short lengths or sheets. The sheets thus formed are then matched into pairs and doubled, forming packs which are reheated and again rolled to reduce their gage.

The present invention has for its object the provision of a novel conveying table and matcher or sheet receiving mechanism adapted to receive and hold the sheared sheets until two are positioned, one on top of the other, or matched and then to lower the matched sheets onto the conveying table which will convey them onto the doubling mechanism.

Another object is to provide the novel construction, design and combination of apparatus hereinafter described in detail and illustrated in the accompanying drawings:

In the drawings—

Figure 3 is a transverse section on the line III—III of Figure 1.

Figure 1:
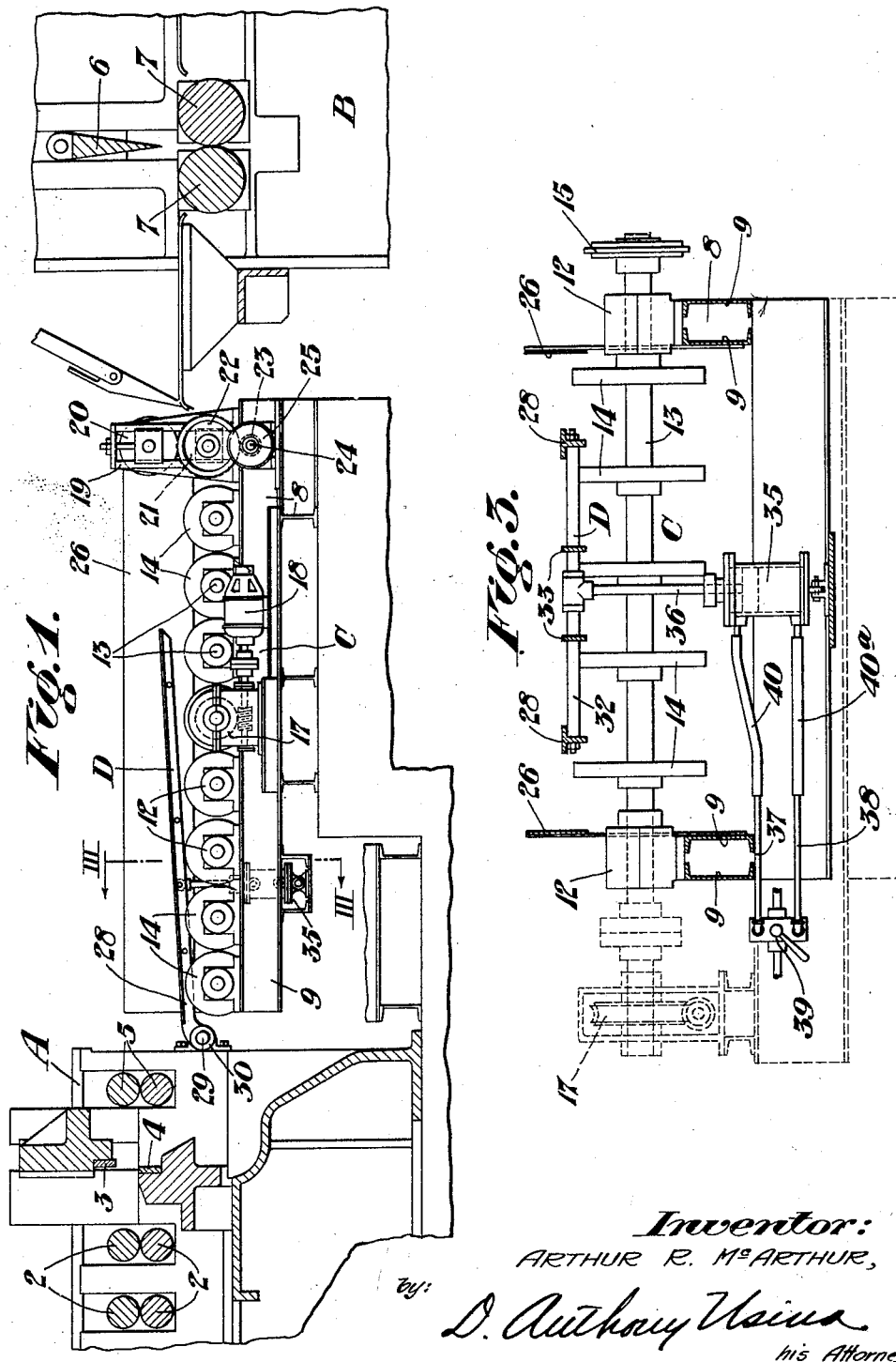
Figure 1 is a side elevation partly in section showing a shearing apparatus, conveying table and matcher, and doubler assembled in accordance with and embodying this invention.
Figure 2:
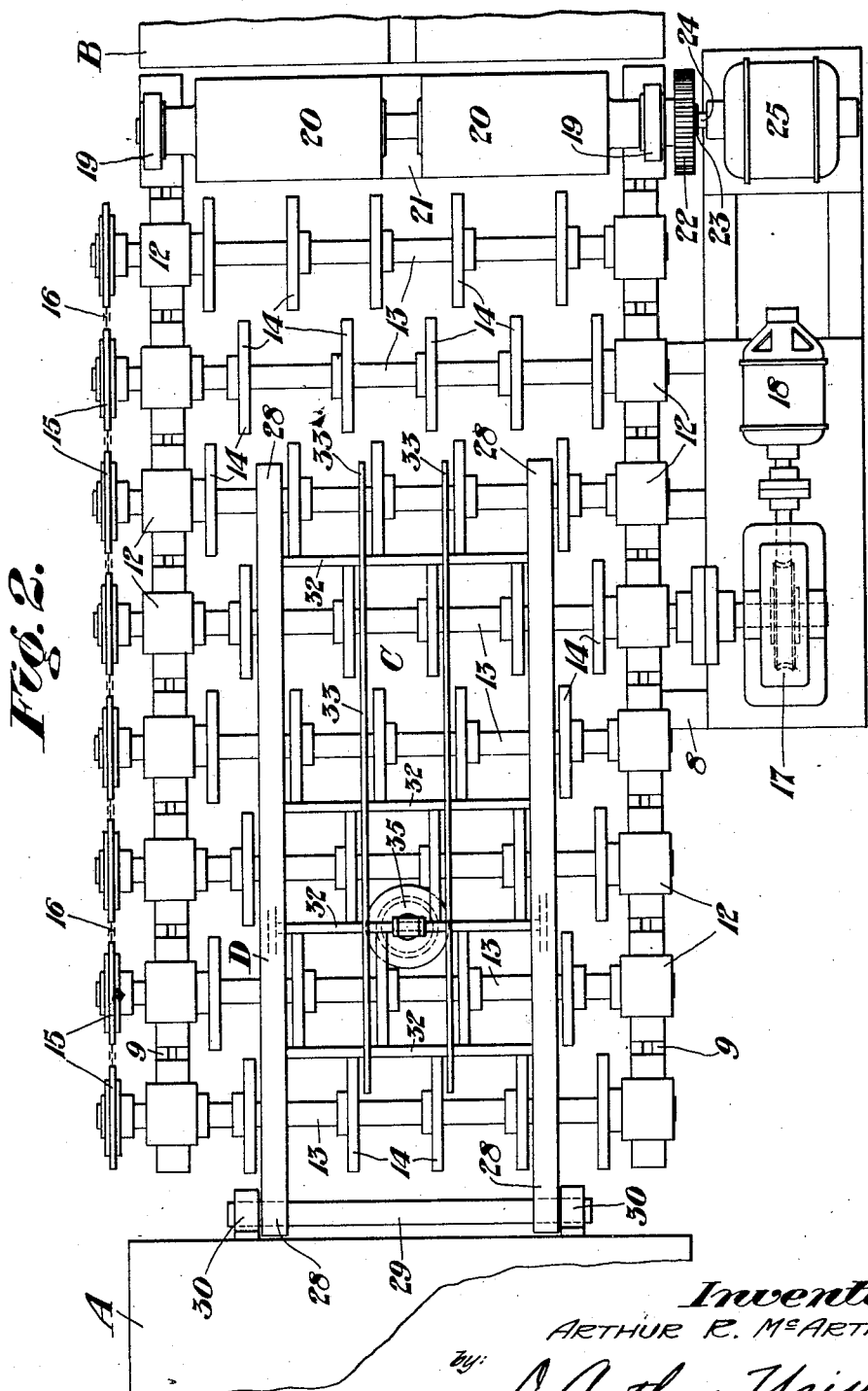
Figure 2 is a plan thereof.

Referring more particularly to the drawings the letter A designates the shearing apparatus as a whole which may be of any standard design but is shown as having a plurality of quick feed rollers 2, for feeding the strip to be sheared through the shear, a pair of shear blades or knives 3 and 4, and a pair of pinch rollers 5 beyond the shear blades for conveying the sheared sheets onto the matcher (to be described).

The doubler is of the standard roll type and is only indicated generally on the drawings. The doubler is designated generally by the letter B and has the usual doubling blade or knife 6 and doubling rolls 7.

The letter C designates the conveying table as a whole which is mounted between the shearing apparatus A and doubler B.

The conveying table C is of the disk roller type and comprises a rigid bed 8 composed of rolled structural shapes including side beams 9 which support a plurality of bearings 12 in which the shafts 13 carrying conveying roller disks 14 are journaled.

The shafts 13 are extended beyond the bearings 12 at one side of the bed 8 and have sprockets 15 mounted thereon which are connected by a drive chain 16.

One of the shafts 13 is extended beyond the bearing 12 at the side of the frame opposite from the sprockets 15 and is connected by a standard reduction gear assembly 17 with the armature shaft of a motor 18.

A feed out pinch roller stand 19 is provided at the discharge or doubler end of the table C and the pinch rollers 20 and 21 are journaled therein. The lower roller 21 is provided with a gear 22 which is in mesh with a pinion 23 on the armature shaft 24 of a motor 25. The pinch rollers 20 and 21 are adapted to feed the matched sheets from the table C onto the doubler B.

A pair of side guide plates 26 are mounted at opposite sides of the table to guide the sheared sheets as they are conveyed along the table C.

A matching frame D is provided for receiving the sheets as they are delivered over the table C by the pinch rollers 5 of the shear. The matching frame D comprises a pair of side arms 28 secured to a shaft 29 journaled in bearings 30 on the shear. The arms 28 extend over the conveying table C and are positioned so as to fit between the disks 14 of the conveying table when they are in their lowered position. The side arms 28 are connected together by framework composed of transverse and longitudinal members 32 and 33, respectively, also spaced so as to fit between the disks 14 when the matcher is in its lowered position. By spacing the side arms 28 and members 32 and 33 so that they will fit between the disks 14 when the matching frame is lowered, it will be seen that the matching frame may thus be lowered below the top plane of the conveying table C so that the matched sheets will be engaged by the disks 14 and conveyed forwardly along the table C and into the bite of the pinch rollers 20—21 which will feed the matched sheets onto the doubler B.

The position of the matcher frame D is controlled by a fluid pressure cylinder 35 which is flexibly or pivotally supported on the conveyor table bed 8 and has its plunger 36 connected to one of the transverse members 32 of the matching frame. Fluid is adapted to enter the opposite ends of the cylinder through conduits 37 and 38 leading from a four-way valve 39 positioned adjacent the shear. The conduits 37 and 38 are connected to the cylinder 35 by short lengths of flexible conduits 40 and 40ª so as to permit cylinder 35 to flex when the matcher is raised or lowered.

The matching frame D is normally held in its uppermost position and is lowered only when two plates or sheets are matched on the frame, so as to deliver the matched sheets onto the conveying rollers of the table C.

While I have shown and described the matching frame D as being pivotally supported by the shaft 29, journaled in bearings 30 on the shear, it will be understood that I do not wish to be limited to this specific construction since, if desired, or found necessary, the matcher frame may have its position reversed and the shaft 29 may be mounted in bearings on the doubler B. It may be particularly desirable to reverse the position of the matcher mounting in some instances in order that the highest end of the matcher will be positioned next to the shear and, therefore, will receive the cut sheets with a minimum of drop.

In operation, the shear operator will make certain that the matching frame D is in its uppermost position. He will then operate the shearing apparatus A to shear off a length of strip comprising one sheet which will be fed out onto the matching frame D, and operate the shearing apparatus again to shear off a length of strip comprising a second sheet which will be fed out on top of the first sheet supported on the raised matching frame D, thus forming a pair of matched sheets. The operator will now operate the valve 39 to admit fluid under pressure above the plunger of the cylinder 35 and exhaust the fluid from below the plunger, thereby lowering the matching frame D to its lower position below the upper plane of the conveying table C so as to bring the matched sheets into engagement with the disks 14 of the conveying table and permit said disks to convey said matched sheets forward into the bite of the pinch rollers 20 and 21, which in turn will feed the matched sheets onto the doubler B.

After the matched sheets are conveyed from over the lowered matching frame D, the operator will reverse the valve 39 so as to admit fluid under pressure into the cylinder 35 below the piston and to exhaust the fluid from above the piston, thus causing the plunger 36 to elevate the matching frame D again to its uppermost position in readiness to receive another pair of sheets.

While I have shown and described one specific embodiment of my invention, it will be understood that I do not wish to be limited thereto since various modifications may be made without departing from the scope of my invention as described in the appended claims.

I claim—

1. The combination with a metal shearing apparatus for shearing strips of relatively light metal into relatively short length sheets, and a doubling apparatus spaced a material distance from said shearing apparatus, of a conveyer table arranged between said shearing apparatus and said doubling apparatus for conveying the sheared sheets to said doubler, means normally positioned above said conveying table for receiving and holding said sheets above said table, and power means under the control of the operator for moving said first named means into a position below the upper plane of said table so as to deliver said sheets to said table.

2. The combination with a metal shearing apparatus for shearing strips of relatively light metal into relatively short length sheets, and a doubling apparatus spaced a material distance from said shearing apparatus, of a conveying table of the disk roller type arranged between said shearing apparatus and said doubling apparatus for conveying the sheared sheets to said doubler, a rack pivotally secured to said shearing apparatus and projecting over said conveying table and adapted to receive and hold said sheets above said table, said rack being normally positioned above the upper plane of said table and being movable down between the disks of said table rollers to a point below the upper plane of said table so as to deliver said sheets to said table, and power means under the control of the operator for moving said rack into its lower and upper positions.

3. The combination with a metal shearing apparatus for shearing strips of relatively light metal into relatively short length sheets, and a doubling apparatus spaced a material distance from said shearing apparatus, of a conveying table of the disk roller type arranged between said shearing apparatus and said doubling apparatus for conveying the sheared sheets to said doubler, a rack pivotally mounted at one end of and extending over said conveyer table and adapted to receive and hold said sheets above said table, said rack being normally positioned above the upper plane of said table and being movable down between the disks of said table rollers to a point below the upper plane of said table so as to deliver said sheets to said table, and means under the control of the operator for moving said rack into its lower and upper positions.

In witness whereof, I have hereunto signed my name.

ARTHUR R. McARTHUR.